(12) United States Patent
Benevelli et al.

(10) Patent No.: US 12,109,848 B2
(45) Date of Patent: Oct. 8, 2024

(54) VALVE ASSEMBLY AND TIRE INFLATION SYSTEM INCLUDING SAID VALVE ASSEMBLY

(71) Applicant: Dana Motion Systems Italia S.R.L., Reggio Emilia (IT)

(72) Inventors: Alessandro Benevelli, Borzano di Albinea (IT); Nicola Francesco Musciagna, San Giovanni (IT); Piergiorgio Trinchieri, Reggio Emilia (IT)

(73) Assignee: DANA MOTION SYSTEMS ITALIA S.R.L., Reggio Emilia (IT)

( * ) Notice: Subject to any disclaimer, the term of this patent is extended or adjusted under 35 U.S.C. 154(b) by 848 days.

(21) Appl. No.: 17/151,616

(22) Filed: Jan. 18, 2021

(65) Prior Publication Data

US 2021/0221185 A1 Jul. 22, 2021

(30) Foreign Application Priority Data

Jan. 20, 2020 (EP) .................................. 20 152 659

(51) Int. Cl.
*B60C 23/00* (2006.01)
*B60C 29/00* (2006.01)
*F16K 31/122* (2006.01)
(52) U.S. Cl.
CPC ...... *B60C 23/00354* (2020.05); *B60C 29/002* (2013.01); *F16K 31/1221* (2013.01); *F16K 31/1226* (2013.01)

(58) Field of Classification Search
CPC .......... B60C 23/00354; F16K 31/1221; F16K 31/1226
See application file for complete search history.

(56) References Cited

U.S. PATENT DOCUMENTS 2,928,417 A * 3/1960 Buckner ............... F16K 15/063
137/538
5,240,036 A * 8/1993 Morris .................. F16K 47/011
137/514.7
(Continued)

FOREIGN PATENT DOCUMENTS

GB 1293036 A 10/1972
WO 2018082995 A1 5/2018

OTHER PUBLICATIONS

European Patent Office, Extended European Search Report Issued in Application No. 20152659.7, Jul. 21, 2020, Germany, 7 pages.

*Primary Examiner* — Jason R Bellinger
(74) *Attorney, Agent, or Firm* — McCoy Russell LLP

(57) ABSTRACT

A valve assembly for use in a tire inflation system, the valve assembly including: a valve body including a first fluid port and a second fluid port; a piston disposed at least partially within the valve body and configured to be moved relative to the valve body between an open position and a closed position. When the piston is in the open position, the first fluid port is fluidly connected with the second fluid port. When the piston is in the closed position, the first fluid port is fluidly isolated from the second fluid port. When the piston is in the open position, the first fluid port and the second fluid port are fluidly connected with one another via a fluid channel extending through the piston. A tire inflation system including the valve assembly.

20 Claims, 4 Drawing Sheets

(56) References Cited

U.S. PATENT DOCUMENTS

| | | | | |
|---|---|---|---|---|
| 6,474,383 B1* | 11/2002 | Howald | ............ | B60C 23/00318 |
| | | | | 152/416 |
| 8,307,868 B2* | 11/2012 | Medley | ................. | F16K 27/003 |
| | | | | 152/417 |
| 8,844,596 B2* | 9/2014 | Medley | ................. | B60C 23/002 |
| | | | | 152/428 |
| 9,649,893 B2* | 5/2017 | Wagemann | ....... | B60C 23/00318 |
| 10,030,781 B2* | 7/2018 | Sidders | ................... | F16K 15/20 |
| 10,852,753 B2* | 12/2020 | Jung | ................... | F16K 31/1221 |
| 2013/0276902 A1* | 10/2013 | Medley | ............. | B60C 23/00372 |
| | | | | 137/12 |
| 2013/0282232 A1 | 10/2013 | Medley et al. | | |

* cited by examiner

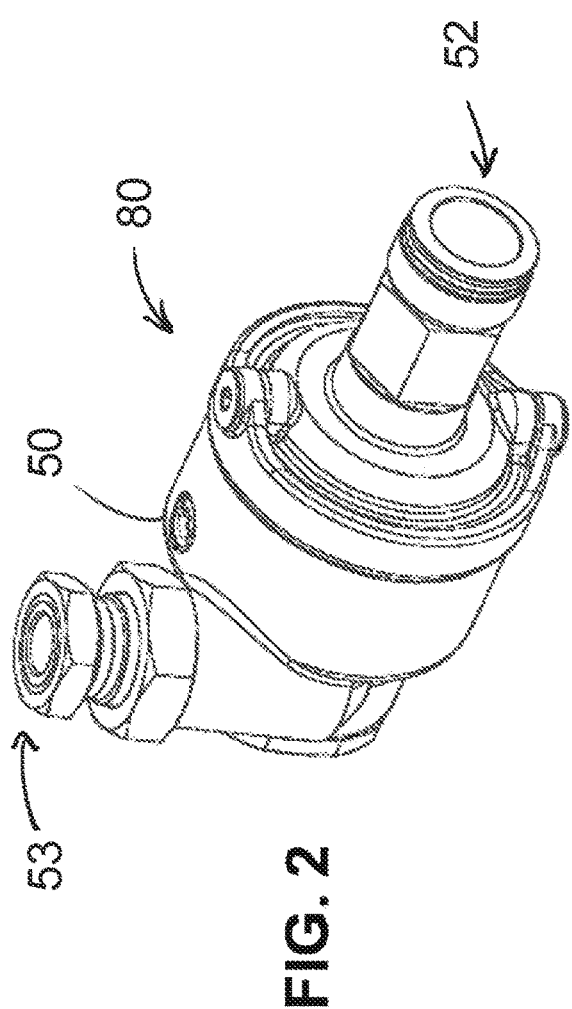
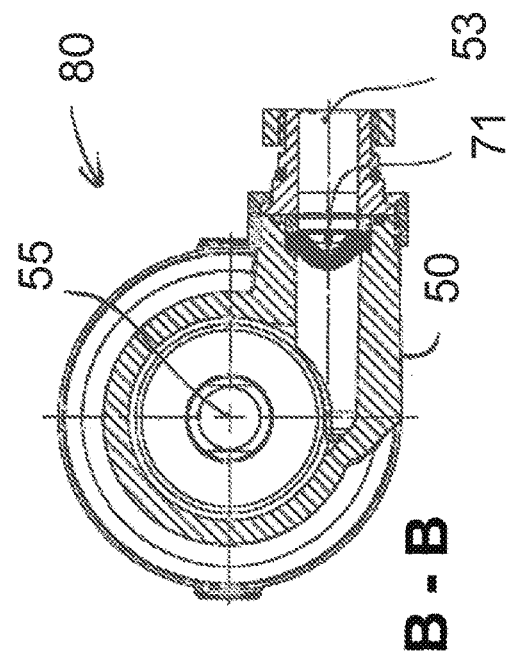
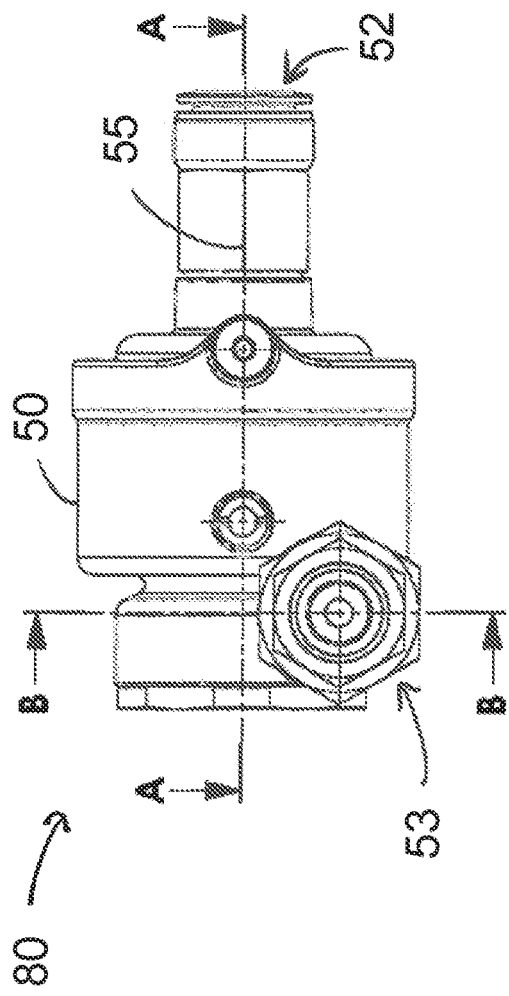

VALVE ASSEMBLY AND TIRE INFLATION SYSTEM INCLUDING SAID VALVE ASSEMBLY

CROSS-REFERENCE TO RELATED APPLICATION

The present application claims priority to European Patent Application No. 20 152 659.7, entitled "VALVE ASSEMBLY AND TIRE INFLATION SYSTEM INCLUDING SAID VALVE ASSEMBLY", and filed on Jan. 20, 2020. The entire contents of the above-listed application are hereby incorporated by reference for all purposes.

TECHNICAL FIELD

The present disclosure relates to a valve assembly, in particular for use in a tire inflation system, and to a tire inflation system including said valve assembly. Tire inflation systems of the presently proposed type may be installed on vehicles such as trucks or on working machines such as tractors, wheel loaders, dumpers, wheeled excavators, or the like.

BACKGROUND AND SUMMARY

Tire inflation systems are becoming crucial for certain vehicles such as trucks, tractors and earth-moving vehicles. Tire inflation systems are utilized to measure and adjust the tire pressure to provide the vehicle with the versatility to maneuver over different terrain types and to reduce maintenance requirements. For example, the pressure of a vehicle tire may be lowered to provide additional traction for the vehicle when the vehicle travels on soft terrain such as sand or mud, or the tire pressure may be raised to reduce the rolling resistance of the vehicle when the vehicle travels on an asphalt road. Tire inflation systems typically comprise a main fluid line for inflating and for deflating the tire, a wheel valve for controlling the processes of inflating and of deflating the vehicle tire, and a pilot fluid line for selectively opening and closing the wheel valve by applying a pilot pressure or a pilot pressure pulse to the wheel valve.

WO2018082995A1 discloses a valve assembly for use in a tire inflation system, the valve assembly comprising a first fluid port, a second fluid port, a movable member configured to be moved between an open position and a closed position, wherein when the movable member is in the open position the first fluid port is in fluid communication with the second fluid port, and wherein when the movable member is in the closed position the first fluid port is fluidly isolated from the second fluid port, a first pneumatic actuator in fluid communication with the first fluid port, the first pneumatic actuator configured to bias the movable member toward the open position, a second pneumatic actuator in fluid communication with the first fluid port, the second pneumatic actuator configured to bias the movable member toward the closed position, and a flow restrictor, wherein the first fluid port is in fluid communication with the second pneumatic actuator by way of the flow restrictor, for example at least when the movable member is in the open position. The valve assembly according to WO2018082995A1 may be operated using a single fluid line for both inflating and deflating the tire, and for piloting the valve assembly.

Based on the prior art the present disclosure addresses the problem of providing a more compact valve assembly.

Thus, a valve assembly is presently proposed, in particular for but not restricted to use in a tire inflation system. The proposed valve assembly comprises:
   a valve body comprising a first fluid port and a second fluid port, and
   a piston disposed at least partially within the valve body and configured to be moved relative to the valve body between an open position and a closed position,
      wherein when the piston is in the open position the first fluid port is fluidly connected with the second fluid port, and
   wherein when the piston is in the closed position the first fluid port is fluidly isolated from the second fluid port,
   wherein when the piston is in the open position the first fluid port and the second fluid port are fluidly connected with one another via a fluid channel extending through the piston.

Further, a tire inflation system is proposed. The proposed tire inflation system comprises:
   the above-mentioned valve assembly,
   a pneumatic tire fluidly connected with the second fluid port of the valve assembly, and
   a pressure source, such as a compressor,
      wherein for pressurizing the pneumatic tire the first fluid port of the valve assembly is selectively fluidly connected with the pressure source, and wherein for depressurizing the pneumatic tire the first fluid port is selectively fluidly connected with the atmosphere.

The fact that when the piston is in the open position the first fluid port and the second fluid port are fluidly connected with one another via the fluid channel extending through the piston allows the valve assembly to be designed in a particularly compact manner.

Typically, the piston is linearly movable with respect to the valve body along a valve axis. However, in some embodiments the piston may likewise be configured to be moved between the open position and the closed position by performing a rotating motion.

The valve assembly may comprise a sealed control chamber and a check valve or one-way valve selectively fluidly connecting the sealed control chamber with the atmosphere. In particular, the sealed control chamber and the piston may be configured such that a volume of the sealed control chamber changes as the piston is moved between the open position and the closed position.

The sealed control chamber and the check valve may be configured to additionally influence or control the dynamics of the piston as it moves between the open position and the closed position. For instance, depending on a ratio $V_{c,max}/V_{c,min}$, wherein $V_{c,max}$ and $V_{c,min}$ are a maximum volume and a minimum volume of the sealed control chamber during a full stroke of the piston, respectively, depending on the direction in which fluid is a allowed to flow through the check valve and on the direction in which the check valve blocks a flow of fluid through the check valve, and possibly also depending on a minimum cross section of the check valve, a fluid or a fluid pressure inside of the sealed control chamber may be configured to exert an additional force on the piston as the piston moves between the open position and the closed position. For example, the ratio $V_{c,max}/V_{c,min}$ may be equal to or larger than a threshold value $r_c$, i. e. $V_{c,max}/V_{c,min} \geq r_c$. For example, the threshold value $r_c$ may fulfill the relation $r_c \geq 1.2$, $r_c \geq 1.4$, or $r_c \geq 1.6$.

In particular, the sealed control chamber, the piston and the check valve may be configured such that as the piston moves or is moved toward the open position the volume of the sealed control chamber decreases and the check valve allows a fluid flow out of the sealed control chamber through the check valve, and such that as the piston moves or is moved toward the closed position the volume of the sealed control chamber increases and the check valve blocks a fluid flow into the control chamber through the check valve. In this way, the piston may create an underpressure in the sealed control chamber as the piston moves or is moved toward the closed position. This underpressure in the sealed control chamber then exerts a force on the piston that biases or additionally biases the piston toward the open position, thereby stabilizing the piston in the open position. The magnitude of the underpressure created in the sealed control chamber typically depends on the ratio $V_{c,max}/V_{c,min}$ mentioned above. For example, the larger the value of the ratio $V_{c,max}/V_{c,min}$ the larger the underpressure created in the sealed control chamber as the piston moves or is moved toward the closed position.

The valve body may be formed in one piece. Alternatively, the valve body may include separate pieces rigidly connected to one another. The valve assembly may further comprise a guide portion formed within or at least partially within the valve body for guiding the piston. The valve body and the guide portion may be formed in one piece. Alternatively, the valve body and the guide portion may be formed as separate pieces rigidly connected to one another. A body portion of the piston may be received or at least partially received within the guide portion. For example, the guide portion may have the shape of a hollow cylinder and the body portion of the piston may have a cylindrical shape. However, it is understood that the guide portion and the body portion of the piston may have other shapes. The sealed control chamber or at least a portion thereof may be formed in between the body portion of the piston and the guide portion of the valve body. This arrangement of the sealed control chamber may contribute to the compact design of the valve assembly.

The valve assembly may comprise a first control volume formed within the valve body and fluidly connected or fluidly connectable with the first fluid port, wherein the piston and the first control volume are configured such that a fluid pressure in the first control volume biases the piston towards the open position. In this way, an opening force biasing the piston toward the open position may be controlled by controlling a fluid pressure in the first control volume, for example via the first fluid port. For example, the opening force biasing the piston toward the open position may be increased by increasing a fluid pressure in the first control chamber and may be decreased by decreasing a fluid pressure in the first control chamber.

The valve assembly may further comprise a second control volume formed within the valve body and fluidly connected or fluidly connectable with the first fluid port and/or with the first control volume, optionally only with the first fluid port and/or with the first control volume, wherein the piston and the second control volume are configured such that a fluid pressure in the second control volume biases the piston towards the closed position. In this way, a closing force biasing the piston toward the closed position may be controlled by controlling a fluid pressure in the second control volume. For example, the closing force biasing the piston toward the closed position may be increased by increasing a fluid pressure in the second control chamber and may be decreased by decreasing a fluid pressure in the second control chamber.

The piston may comprise a body portion and an actuation portion. The actuation portion may extend from the body portion, for example perpendicular to a direction of movement of the piston. For example, when the piston is linearly movable with respect to the valve body along the valve axis, the actuation portion may extend from the body portion of the piston in a direction perpendicular to the valve axis. The actuation portion may comprise a first actuation surface delimiting the first control volume and a second actuation surface delimiting the second control volume. A fluid pressure in the first control volume may exert an opening force on the first actuation surface biasing the piston toward the open position. And a fluid pressure in the second control volume may exert a closing force on the second actuation surface biasing the piston toward the closed position.

In some embodiments the piston, and in particular the actuation portion of the piston may be configured such that an area of the first actuation surface is larger than an area of the second actuation surface such that when a fluid pressure in the first control volume is equal to a fluid pressure in the second control volume, a net force on the piston resulting from an opening force exerted on the first actuation surface by a fluid pressure in the first control volume and from a closing force exerted on the second actuation surface by a fluid pressure in the second control volume biases the piston toward the open position. However, it is understood that in some embodiments the piston, and in particular the actuation portion of the piston may be configured such that an area of the first actuation surface is equal to an area of the second actuation surface, or that an area of the first actuation surface is smaller than an area of the second actuation surface.

The second control volume may be fluidly connected or fluidly connectable with the first fluid port and/or with the first control volume through an orifice. The orifice then typically restricts a fluid flow between the first fluid port and the second control volume and/or between the first control volume and the second control volume. The orifice may be formed in or may extend through the piston or through a portion of the piston. Forming the orifice in the piston or having the orifice extend through the piston or through a portion of the piston may contribute to the compact design of the valve assembly.

The orifice between the first fluid port and the second control volume and/or between the first control volume and the second control volume is configured to delay the pressurization and depressurization of the second control volume with respect to the pressurization and depressurization of the first control volume, respectively. For example, the piston may be moved toward the open position by pressurizing the first control volume through the first fluid port, thereby increasing an opening force exerted on the piston by a fluid pressure in the first control volume. In this situation, the orifice delays the pressurization of the second control volume and, thus, the increase of a closing force exerted on the piston by a fluid pressure in the second control volume that may counteract the opening force, thereby facilitating the movement of the piston toward the open position. And once the second control volume has been pressurized through the orifice, the piston may again be moved toward the closed position by depressurizing the first control volume through the first fluid port, thereby decreasing an opening force exerted on the piston by a fluid pressure in the first control volume. In this situation, the orifice delays the depressurization of the second control volume and the decrease of a closing force exerted on the piston by a fluid pressure in the second control volume, such that the fluid pressure in the second control volume may force or may additionally force the piston toward the closed position, thereby facilitating the movement of the piston toward the closed position.

A parameter that may be used to characterize the dynamics of the piston and in particular the above-described delay of the pressurization and depressurization of the second control volume with respect to the pressurization and depressurization of the first control volume, respectively, is the ratio $V_2/A_2$ between the volume $V_2$ of the second control volume. In one example, the ratio is the minimum volume of the second control volume during a full stroke of the piston, and the minimum cross section $A_2$ of the orifice. A skilled person understands that said delay increases or becomes more pronounced as the volume $V_2$ of the second control volume increases and as the minimum cross section of the orifice $A_2$ decreases. For example, $V_2$ and $A_2$ may fulfill the following relation: $V_2/A_2 \geq 5 \cdot 10^3$ mm, or optionally $V_2/A_2 \geq 10^4$ mm, or optionally $V_2/A_2 \geq 2 \cdot 10^4$ mm, wherein $V_2$ is measured in mm$^3$ and wherein $A_2$ is measured in mm$^2$.

The valve assembly may further comprise a biasing member such as a spring or another elastic element. The biasing member may be configured to bias the piston toward the closed position. However, it is understood that in some embodiments the biasing member may be configured to bias the piston toward the open position. The valve assembly may be particularly compact when the biasing member is disposed in the first control volume or in the second control volume. However, it is understood that the biasing member may be disposed elsewhere within the valve body. A stiffness or a spring constant of the biasing member may be chosen based on one or more of the fluid pressures to be applied at the first fluid port and at the second fluid port, an area of the first and the second actuation surface of the actuation portion of the piston, a volume of the first and of the second control volume, the ratio $V_{c,max}/V_{c,min}$, and the ratio $V_2/A_2$, for example.

The sealed control chamber, the piston, in particular the actuation portion of the piston including the first actuation surface and the second actuation surface, and possibly the biasing member may be configured such that when the piston is in the open position a pressure $p_1$ applied at the first fluid port is sufficient to keep the piston in the open position when or as long as said pressure $p_1$ is above atmospheric pressure $p_{atm}$ by an amount $\Delta p$, i. e. when or as long as $p_1 \geq p_{atm} + \Delta p$. This allows a pneumatic tire fluidly connected with the second fluid port and having a tire pressure of $p_{tire} > p_{atm} + \Delta p$ to be deflated via the first fluid port, where $p_{tire}$ is the pressure inside the pneumatic tire. $\Delta p$ may be as low as between 0.1 bar and 1 bar, for example. For instance, $\Delta p$ may be 0.2 bar or 0.4 bar. It is understood that the valve assembly may be designed such that $\Delta p$ is larger than 0.4 bar or smaller than 0.2 bar.

The piston may comprise a seal portion. The seal portion of the piston may extend from the body portion of the piston perpendicular to a valve axis defined by a linear direction of motion of the piston with respect to the valve body. The valve assembly may further comprise a seat portion forming a valve seat for the seal portion of the piston. The seat portion and the valve body may be formed in one piece. Alternatively, the seat portion and the valve body may be formed as separate pieces rigidly connected to one another. The seat portion and the piston may be configured such that when the piston is in the closed position the seal portion of the piston is sealingly received in the seat portion and fluidly isolates the first fluid port from the second fluid port. The seal portion of the piston sealingly received in the seat portion may form a closed valve with zero leakage. For example, the piston and the seat portion may be configured such that when the piston is in the closed position a fluid pressure at the second fluid port exerts a closing force on the piston which forces or biases the seal portion of the piston against the seat portion. When the second fluid port is fluidly connected with a pneumatic tire, this arrangement allows a tire pressure inside the pneumatic tire to exert a closing force on the seal portion of the piston when the piston is in the closed position.

The above mentioned fluid channel may extend through the piston at least partially along a valve axis defined by a linear direction of movement of the piston with respect to the valve body. The piston may further comprise one or more side openings in fluid communication with the axially extending fluid channel, the side openings ending in an axially extending outer surface of the piston and being disposed at a distance from the seal portion of the piston along the valve axis, wherein when the piston is in the open position the first fluid port and the second fluid port are fluidly connected with one another via the fluid channel and the side openings. This design may contribute to the compact layout of the valve assembly.

BRIEF DESCRIPTION OF THE FIGURES

Embodiments of the presently proposed valve assembly and tire inflation system are described in the following detailed description and are depicted in the accompanying drawing in which:

FIG. 2 schematically shows a perspective view of one of the valve assemblies depicted in FIG. 1;

FIG. 3 schematically shows a side view of the valve assembly of FIG. 2;

FIG. 4 schematically shows a first sectional view of the valve assembly of FIG. 2;

DETAILED DESCRIPTION

Figure 1:
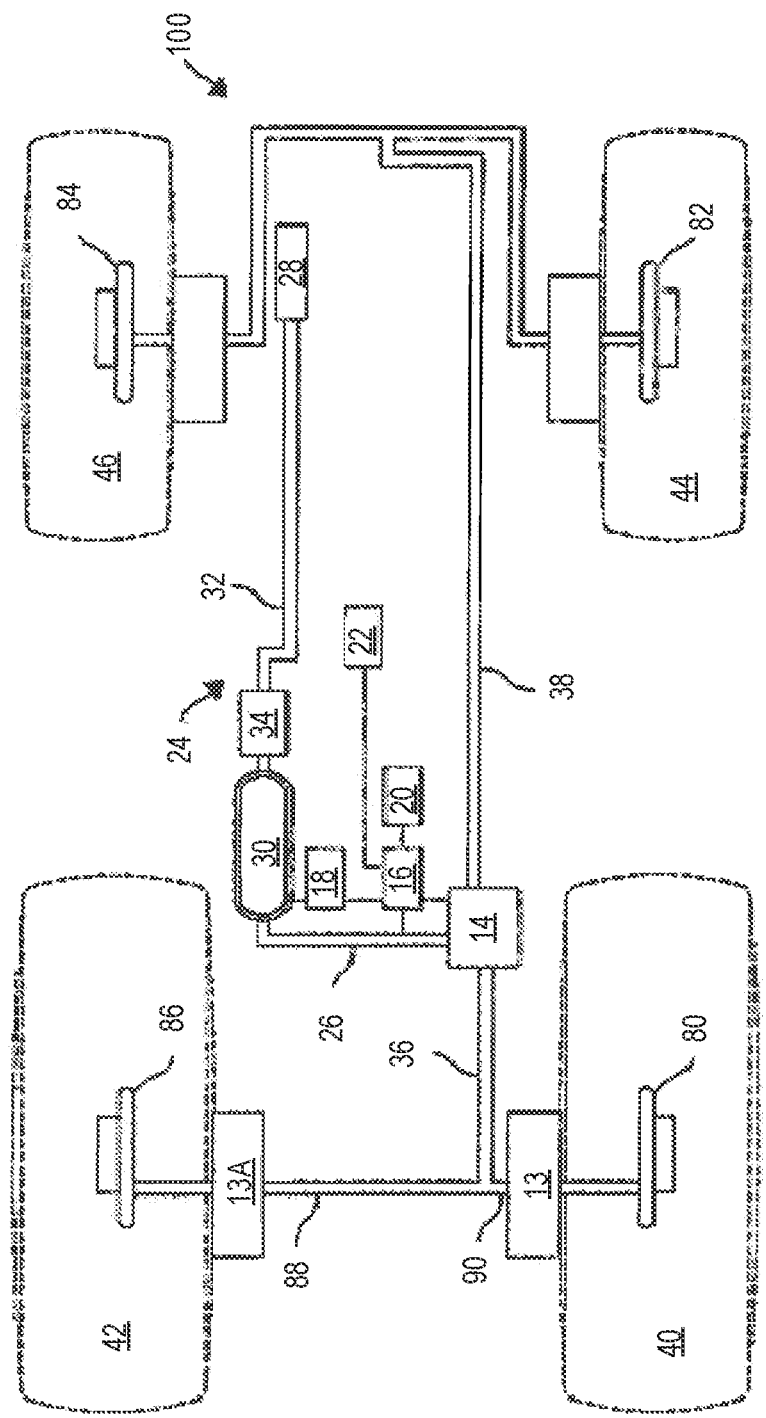
FIG. 1 schematically shows an embodiment of a tire inflation system including a number of valve assemblies.

A schematic illustration of an embodiment of a tire inflation system 100 is illustrated in FIG. 1. The tire inflation system 100 comprises a pneumatic control portion 14. The pneumatic control portion 14 may comprise a pressure sensor and a temperature sensor for measuring the pressure and the temperature of a fluid such as air, for example. Typically, the pneumatic control portion 14 also comprises one or more valves such as solenoid valves, and one or more fluid conduits for controlling the flow of air through the system 100. The pneumatic control portion 14 may further comprise a vent for selectively placing fluid control circuits 36, 38 in fluid communication with the atmosphere. Furthermore, the pneumatic control portion 14 may comprise a variable flow restrictor for controlling a flow of air through the vent.

The tire inflation system 100 also comprises an electronic control portion 16. The electronic control portion 16 may be configured to receive input signals from the pressure sensor and/or from the temperature sensor. The electronic control portion 16 typically further comprises a power supply and is in communication with one or more additional sensors such as, for example, a pressure switch 18 and a speed sensor 20. The electronic control portion 16 may also be configured to receive input signals from an operator control device 22. The operator control device 22 may include a switch, a lever, a touchscreen, or the like. The electronic control portion 16 may include a microprocessor (not depicted) operating under the control of a set of programming instructions, which may also be referred to as software. The electronic control portion 16 may include a memory (not depicted) in which programming instructions are stored. The memory may also store identification codes, tire pressure records and/or user inputs over a period of time.

The electronic control portion 16 may be configured to output signals to the pneumatic control portion 14 to, for example, open or close the valves of the pneumatic control portion 14. The electronic control portion 16 may further be configured to output signals to a display device (not depicted). The display device may be included as a part of the operator control device 22 or as a freestanding device.

The pneumatic control portion 14 and the electronic control portion 16 may be configured to communicate with a fluid supply or air supply 24 via an air supply circuit 26. The pressure sensor measures the pressure of the air supply 24 via the air supply circuit 26. The air supply 24 may be utilized to increase and/or decrease the tire pressure, if needed.

The fluid supply or air supply 24 may include a pressure source such as an air compressor 28 attached to the vehicle. The air supply 24 may also comprises an air tank 30. In the embodiment depicted in FIG. 1 the compressor 28 is in fluid communication with the air tank 30 via a supply conduit 32. The air compressor 28 supplies pressurized air to the air tank 30 for storage therein. Pressurized air from the air supply 24 may be provided to the air supply circuit 26 via the air tank 30. A drier 34 may be provided for removing water from the air supply 24. A filter (not depicted) may also be interposed in the air supply circuit 26 or the supply conduit 32.

The pneumatic control portion 14 is selectively in fluid communication with the fluid control circuits 36, 38. Each fluid control circuit 36, 38 is utilized to provide fluid communication between the pneumatic control portion 14 and one or more pneumatic tires 40, 42, 44, 46. Fluid communication between the pneumatic control portion 14 and the fluid control circuits 36, 38 may be controllable by opening or closing a valve (not depicted), for example.

Each tire 40, 42, 44, 46 contains air at a certain pressure which will hereinafter be referred to as tire pressure. The tire pressure may be within a predetermined range of a target tire pressure. The target tire pressure can be selected to be a desired pressure. After the target tire pressure is selected, it may be programmed into the electronic control portion 16. If it is determined that the tire pressure is below the range including the target tire pressure, the tire pressure can be increased. If it is determined that the tire pressure is above the range including the target tire pressure, the tire pressure can be decreased. The tire inflation system 100 will be described in more detail below with reference to the tire pressure of one tire 40. However, the tire inflation system 100 may at certain times be in fluid communication with one or more of the tires 40, 42, 44, 46 in order to perform the aforementioned functions.

A valve assembly 80 is provided at an end of the fluid control circuit 36 to control the flow of pressurized air into and out of the tire 40. In one example, a valve assembly 80, 82, 84, 86 is provided for each of the tires 40, 42, 44, 46. Each of the valve assemblies 80, 82, 84, 86 provides selective fluid communication between one of the tires 40, 42, 44, 46 and the fluid supply or air supply 24 including the air compressor 28, and is configured to control the flow of pressurized air into and out of one of the tires 40, 42, 44, 46.

The fluid control circuit 36 comprises fluid conduits 88, 90 and rotary joint assemblies 13, 13A providing fluid communication with the tires 40, 42. The first rotary joint assemblies 13, 13A may be configured in the same manner. The rotary joint assemblies 13, 13A are not limited to use with a drive axle. For example, the rotary joint assemblies 13, 13A may also be suitable for use with a steerable axle. The steerable axle may be driven or non-driven.

Figure 5:
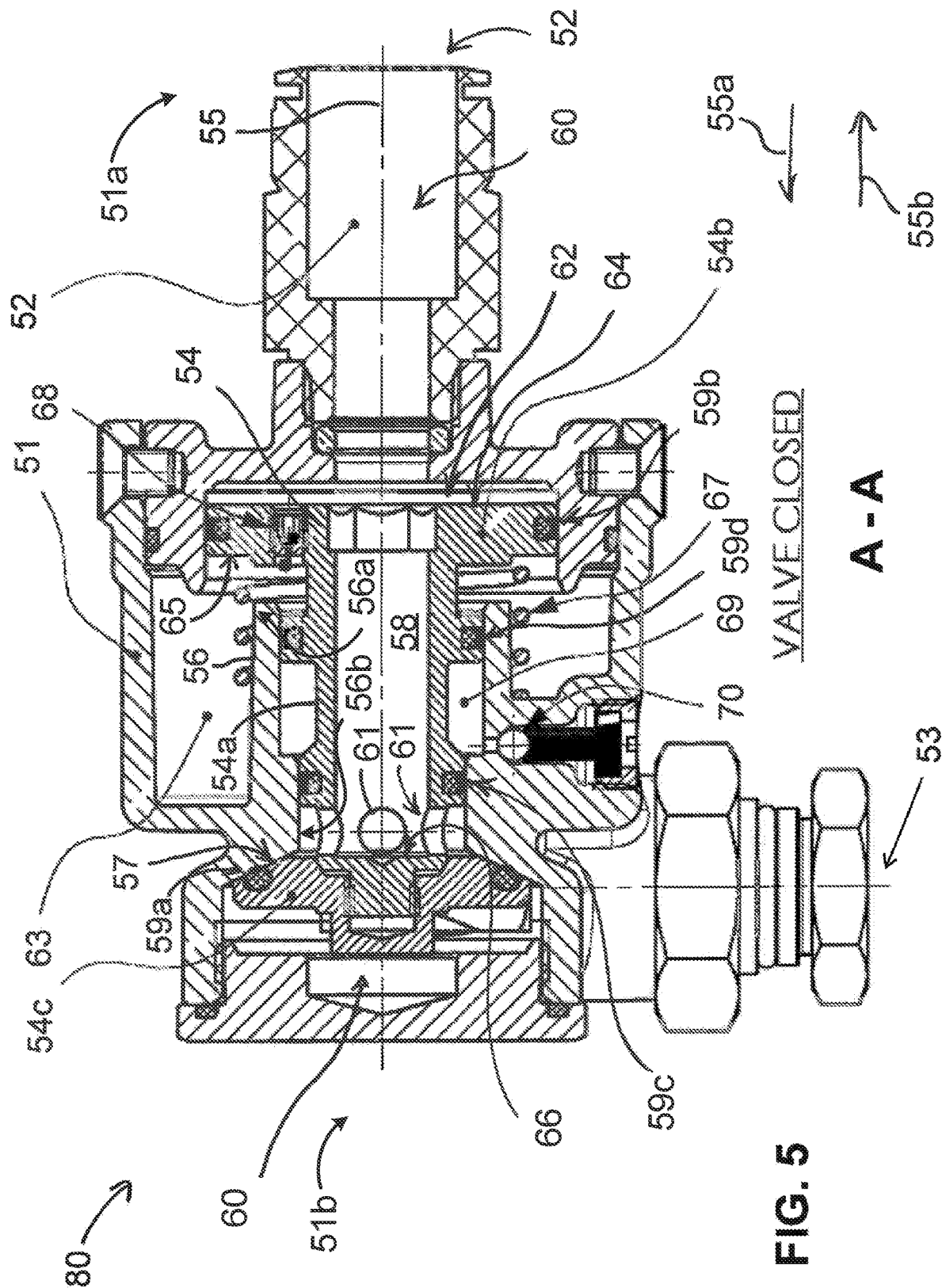
FIG. 5 schematically shows a second sectional view of the valve assembly of FIG. 2, wherein the valve assembly is in an open configuration in which a first fluid port and a second fluid port of the valve assembly are fluidly connected with one another.
Figure 6:
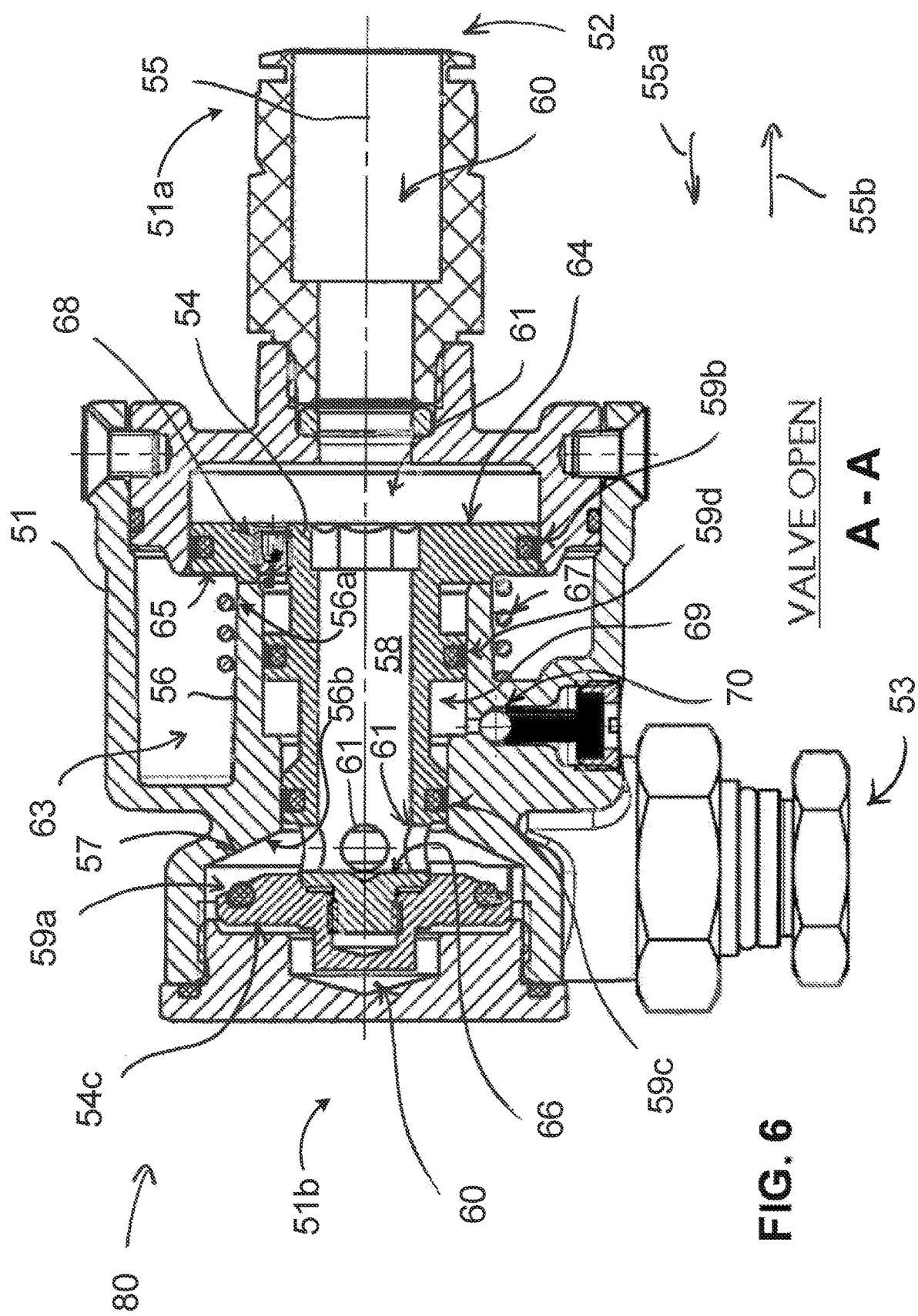
FIG. 6 schematically shows the second sectional view of FIG. 5, wherein the valve assembly is in a closed configuration in which the first fluid port and the second fluid port of the valve assembly are fluidly isolated from one another.

FIGS. 2, 3 and 4 schematically show a perspective view, a side view and a sectional view, respectively, of an embodiment of the valve assembly 80 depicted in FIG. 1 providing selective fluid communication between the tire 40 and the fluid supply or air supply 24. FIGS. 5 and 6 show another sectional view of the valve assembly 80 depicted in FIG. 1, wherein FIGS. 5 and 6 show the valve assembly 80 in a closed configuration and in an open configuration, respectively. The sectional plane B-B of FIG. 4 and the sectional plane A-A of FIGS. 5 and 6 are indicated in FIG. 3. The same features recurring in different figures are designated with the same reference signs throughout.

The valve assembly 80 includes a valve body 50 comprising a housing portion 51 having a first fluid port 52 and a second fluid port 53. A fluid filter or air filter 71 may be disposed at the first fluid port 53 (FIG. 4). In the embodiment depicted in the figures the housing portion 51 includes a plurality of separate pieces connected to one another. It is understood that in alternative embodiments the housing portion 51 may be made in one piece. For example, the housing portion 51 may be made of materials such as metal and/or plastic. The fluid ports 52, 53 are selectively in fluid communication with one another. In the tire inflation system 100 of FIG. 1 the first fluid port 52 is fluidly connected or selectively fluidly connected with the fluid supply or air supply 24 including the air compressor 28 and with the atmosphere, and the second fluid port 53 is fluidly connected with the tire 40, such that fluid such as air may flow into and out of the tire 40 via the valve assembly 80.

A piston 54 is movably disposed within the housing portion 51 of the valve body 50. The piston 54 is linearly movable with respect to the valve body 50 along a valve axis 55. The housing portion 51 has a first axial end 51a and a second axial end 51b and forms an axially extending passage 60 within the housing portion 51. At the first axial end 51a of the housing portion 51 the passage 60 is fluidly connected with the first fluid port 52, and at the second axial end 51b of the housing portion 51 the passage 60 is fluidly connected with the second fluid port 53. The piston 54 is disposed within the axially extending passage 60 formed within the housing portion 51. In the embodiment depicted in the figures the first fluid port 52 is aligned with the valve axis 55, and the second fluid port 53 is arranged perpendicular to the valve axis 55. It is understood that in alternative embodiments the fluid ports 52, 53 may be arranged differently.

The piston 54 may be symmetrical or essentially symmetrical with respect to a symmetry axis coinciding with the axis 55. The piston 54 may be made of or may comprise a rigid material such as metal or plastic. In the embodiment depicted in the figures the piston 54 is made of separate pieces connected to one another. It is understood that in alternative embodiments the piston 54 may be made in one piece. The piston 54 comprises a body portion 54a, an actuation portion 54b and a seal portion 54c. The body portion 54a may have an elongate shape, for example a cylindrical shape. The actuation portion 54b and the seal portion 54c may each have a disc-like shape. The actuation portion 54b and the seal portion 54c extend from the body portion 54a in a direction perpendicular to the valve axis 55. A maximum diameter of the actuation portion 54b perpendicular to the valve axis 55 is larger than a maximum diameter of the body portion 54a. A maximum diameter of the actuation portion 54b perpendicular to the valve axis 55 is larger than the maximum diameter of the body portion 54a. In the embodiment of the valve assembly 80 depicted in the figures the actuation portion 54b and the seal portion 54c are disposed at opposite ends of the piston 54 along the valve axis 55.

The valve assembly 80 comprises a guide portion 56 formed within the valve body 50 for guiding movement of the piston 54 along the valve axis 55. The body portion 54a of the piston 54 is received or at least partially received in the guide portion 56. The guide portion 56 forms a channel-like passage within the housing portion 51. The channel-like passage formed by the guide portion 56 forms part of the axially extending passage 60 formed within the housing portion 51 of the valve body 50. For example, the guide portion 56 may form a cylindrical or essentially cylindrical recess within the housing portion 51 of the valve body 50. The guide portion 56 has a first axial end 56a and a second axial end 56b. At the second axial end 56b of the guide portion 56 and towards the second axial end 51b of the housing portion 51, the guide portion 56 transitions into a seat portion 57 formed within the housing portion 51. The seat portion 57 forms a shoulder portion within the housing portion 51 at which a cross section of the axially extending passage 60 determined perpendicular to the valve axis 55 widens toward the second axial end 51b of the housing portion 51. In the embodiment of the valve assembly 80 depicted in the figures the housing portion 51, the guide portion 56 and the seat portion 57 are formed in one piece. However, it is understood that in alternative embodiments they may be formed as separate pieces.

The piston 54 may be moved with respect to the valve body 50 between a closed position depicted in FIG. 5 and an open position depicted in FIG. 6. When the piston 54 is in the closed position, the first fluid port 52 and the second fluid port 53 are fluidly isolated from one another so that no fluid may flow between the fluid ports 52, 53. When the piston 54 is in the open position, the first fluid port 52 and the second fluid port 53 are fluidly connected with one another via a fluid channel 58 extending through the piston 54. As the piston 54 moves from the closed position toward the open position, the piston 54 moves in a first axial direction 55a along the valve axis 55. Conversely, as the piston 54 moves from the open position toward the closed position, the piston 54 moves in a second axial direction 55b along the valve axis 55.

The valve body 50 or a portion rigidly connected with the valve body 50 forms a mechanical stop for movement of the piston 54 in the first axial direction 55a. When the piston 54 is in the open position, a portion of the piston 54 abuts a portion of the valve body 50. More specifically, a minimum diameter of the actuation portion 54b of the piston 54 determined perpendicular to the valve axis 55 is larger than a maximum diameter of the passage formed by the guide portion 56 at the first axial end 56a of the guide portion 56 so that the first axial end 56a of the guide portion 56 forms a mechanical stop for movement of the piston 54 in the first axial direction 55a. When the piston 54 is in the open position, the actuation portion 54b of the piston 54 abuts the first axial end 56a of the guide portion 56. Similarly, the valve body 50 or a portion rigidly connected with the valve body 50 forms a mechanical stop for movement of the piston 54 in the second axial direction 55b. When the piston 54 is in the closed position, a portion of the piston 54 abuts a portion of the valve body 50. More specifically, a minimum diameter of the seal portion 54c of the piston 54 determined perpendicular to the valve axis 55 is larger than a maximum diameter of the guide portion 56 at the second axial end 56b of the guide portion 56 so that the seat portion 57 forms a mechanical stop for movement of the piston 54 in the second axial direction 55b.

When the piston 54 is in the closed position as shown in FIG. 5, the seat portion 57 forms a valve seat for the seal portion 54c of the piston 54. More specifically, when the piston 54 is in the closed position, the seal portion 54c of the piston 54 is sealingly received in and abuts the seat portion 57, thereby closing the axially extending passage 60 formed within the housing portion 51 and fluidly isolating the fluid ports 52, 53 from one another. In the closed position of the piston 54, the seat portion 57 and the seal portion 54c may form a closed valve having zero leakage. For example, a surface of the seal portion 54c facing in the second axial direction 55b and a surface of the seat portion 57 facing in the first axial direction 55a may have corresponding shapes and abut one another when the piston 54 is in the closed position. In the embodiment depicted in the figures the seal portion 54c of the piston 54 and of the seat portion 57 have correspondingly tapered shapes. Additionally, sealing means 59a may be disposed between the seal portion 54c and the seat portion 57 to provide sealing between the seal portion 54c and the seat portion 57 when the piston 54 is in the closed position. For example, the sealing means 59a may include an elastic sealing ring mounted on the seal portion 54c of the piston 54. When the piston 54 is in the closed position as depicted in FIG. 5, a fluid pressure applied at the second fluid port 53 such as a tire pressure within the tire 40 exerts a closing force on the seal portion 54c and presses the seal portion 54c against the seat portion 57 in the second axial direction 55b.

As the piston 54 moves from the closed position toward the open position, the seal portion 54c of the piston 54 lifts off the seat portion 57, thereby forming a clearance in between the seal portion 54c and the seat portion 57 so that fluid such as air may pass in between the seal portion 54c and the seat portion 57. When the piston 54 is in the open position depicted in FIG. 6, fluid communication between the fluid ports 52, 53 is provided via the fluid channel 58 extending through the piston 54 and via one or more side openings 61. The fluid channel 58 may extend through the piston 54 along the valve axis 55 or at least partially along the valve axis 55. In the embodiment depicted in the figures the fluid channel 58 extends through the body portion 54a and through the actuation portion 54b of the piston 54. The side openings 61 end in an axially extending outer surface of the piston 54 and fluidly connect the fluid channel 58 with the axially extending outer surface of the piston 54. The side openings 61 are disposed at a distance from the seal portion 54c of the piston 54 along the valve axis 55. When the piston 54 is in the open position as depicted in FIG. 6, the side openings 61 are disposed at a distance from the second axial end 56b of the guide portion 56 towards the second axial end 51b of the housing portion 51 along the valve axis 55.

A first control volume 62 and a second control volume 63 are formed within the valve body 50, more specifically within the housing portion 51 of the valve body 50. The first control volume 62 is fluidly connected with the first fluid port 52. The second control volume 63 is fluidly connected with the first control volume 62 and with the first fluid port 52. More specifically, the second control volume 63 is fluidly connected with the first control volume 62 and with the first fluid port 52 via an orifice 68. In the embodiment depicted in the figures the orifice 68 is formed within the piston 54, more specifically in the actuation portion 54b of the piston 54. In other words, the orifice 68 is configured to move with the piston 54. However, it is conceivable that in alternative embodiments the orifice 68 is formed within the valve body 50, for example. The orifice 68 restricts fluid flow between the first fluid port 52 and the second control volume 63 or between the control volumes 62, 63.

The piston 54 and the control volumes 62, 63 are configured such that a volume of each of the control volumes 62, 63 changes as the piston 54 moves between the open position and the closed position. More specifically, the piston 54 and the control volumes 62, 63 are configured such that as the piston 54 moves or is moved toward the open position a volume of the first control volume 62 increases and a volume of the second control volume 63 decreases, and that as the piston 54 moves or is moved toward the closed position a volume of the first control volume 62 decreases and a volume of the second control volume 63 increases. The first control volume 62 is disposed in between the first fluid port 52 and the piston 54, more specifically in between the first fluid port 52 and the actuation portion 54b of the piston 54, such that fluid flowing in between the first fluid port 52 and the fluid channel 58 extending through the piston 54 passes through the first control volume 62. In the embodiment of the valve assembly 80 depicted in the figures sealing means 59b disposed between the actuation portion 54b of the piston 54 and the housing portion 51 provide sliding sealing contact between the actuation portion 54b and the housing portion 51 as the piston 54 moves between the open position and the closed position. For example, the sealing means 59b may include a sealing ring mounted on the actuation portion 54b of the piston 54. The second control volume 63 extends at least partially in between the housing portion 51 and the guide portion 56 in a direction perpendicular to the valve axis 55. For example, the second control volume 63 may have an annular shape and may enclose the guide portion 56.

The first control volume 62 is delimited by a first actuation surface 64 of the actuation portion 54b of the piston 54, and the second control volume 63 is delimited by a second actuation surface 65 of the actuation portion 54b of the piston 54. The actuation surfaces 64, 65 are formed on axially opposing sides of the actuation portion 54b of the piston 54. The actuation surfaces 64, 65 extend perpendicular to the valve axis 55. The first actuation surface 64 faces in the second axial direction 55b, and the second actuation surface 65 faces in the first axial direction 55a. A fluid pressure inside the first control volume 62 exerts an opening force on the first actuation surface 64 and biases the piston 54 toward the open position or in the first axial direction 55a. A fluid pressure inside the second control volume 63 exerts a closing force on the second actuation surface 65 and biases the piston 54 toward the closed position or in the second axial direction 55b. Consequently, when a fluid pressure in the first control volume 62 is equal to a fluid pressure in the second control volume 63, a net force on the piston resulting only from an opening force exerted on the first actuation surface 64 by the fluid pressure in the first control volume 62 and from a closing force exerted on the second actuation surface 65 by the fluid pressure in the second control volume 63 biases the piston 54 toward the open position.

In the embodiment of the valve assembly 80 depicted in the figures the piston 54 is configured such that a fluid pressure inside the fluid channel 58 exerts an additional opening force on a further actuation surface 66 delimiting the fluid channel 58 along the valve axis 55 when or only when the piston 54 is in the closed position. When the piston 54 is in the open position as depicted in FIG. 6, a fluid pressure on axially opposing sides of the seal portion 54c is equal or essentially equal so that no net force or no significant net force is exerted on the seal portion 54c when the piston 54 is in the open position.

In the embodiment depicted in the figures the valve assembly 80 further includes a biasing member 67. Here, the biasing member 67 is configured as a spring. However, in alternative embodiments the biasing member 67 may include another elastic member. The biasing member 67 is configured to bias the piston 54 toward the closed position. The biasing member 67 is disposed within the second control volume 63. The biasing member 67 is supported on a portion of the valve body 50, more specifically on a portion of the housing portion 51. The biasing member 67 is further supported on the actuation portion 54b, more specifically on the second actuation surface 65 of the actuation portion 54b. A closing force exerted on the piston 54 through the biasing member 67 and biasing the piston toward the closed position may depend on a degree of compression of the biasing member 67. For example, the closing force exerted on the piston 54 through the biasing member 67 may increase as the biasing member 67 is further compressed. For instance, the closing force exerted on the piston 54 through the biasing member 67 may be at a maximum when the piston is in the open or fully open position. And the closing force exerted on the piston 54 through the biasing member 67 may be at a minimum when the piston is in the closed position. It is pointed out that in alternative embodiments the valve assembly 80 may not include the biasing member 67.

The piston 54 may be moved from the closed position depicted in FIG. 5 toward the open position depicted in FIG. 6 by increasing a fluid pressure inside the first control volume 62 and inside the fluid channel 58 via the first fluid port 52, thereby increasing an opening force exerted on the first actuation surface 64 and on the further actuation surface 66 and biasing the piston 54 toward the open position. The valve assembly 80 may be opened by moving or placing the piston 54 in the open position in order to inflate or deflate the tire 40 via the valve assembly 80, for example. In order to move the piston 54 from the closed position towards the open position, the opening force exerted on the first actuation surface 64 and on the further actuation surface 66 has to exceed a closing force biasing the piston 54 toward the closed position. When the piston 54 is in the closed position, the total closing force typically includes a closing force exerted on the seal portion 54c by a fluid pressure applied at the second fluid port 53 such as by a tire pressure inside the tire 40, a closing force exerted on the second actuation surface 65 by a fluid pressure inside the second control volume 63, and a closing force exerted on the piston 54 through the biasing member 67.

The orifice 68 facilitates moving the piston 54 from the closed position toward the open position as it delays an increase of a fluid pressure inside the second control volume 63 with respect to an increase of a fluid pressure inside the first control volume 62 and inside the fluid channel 58. This is due to the fact that a ratio $r_1 = V_1/A_1$ is smaller than a ratio $r_2 = V_2/A_2$, wherein $V_1$ is a minimum combined volume of the first control chamber 62 and the fluid channel 58, $A_1$ is a minimum cross section of the first fluid port 52, $V_2$ is a minimum volume of the second control volume 63, and $A_2$ is a minimum cross section of the orifice 68. For example, the ratios $r_1$ and $r_2$ may fulfill the relation $r_2/r_1>20$, $r_2/r_1>50$, or $r_2/r_1>100$. In the embodiment of the valve assembly 80 depicted in the Figures, the minimum volume $V_2$ of the second control volume 63 may be approximately 26 cm³, and the minimum cross section $A_2$ of the orifice 68 may be approximately 0.7 mm². However, it is understood that $V_2$ and $A_2$ may take on other values.

The piston 54 may be moved from the open position depicted in FIG. 6 toward the closed position depicted in FIG. 5 by decreasing a fluid pressure inside the first control volume 62 and inside the fluid channel 58 via the first fluid port 52, thereby decreasing an opening force exerted on the first actuation surface 64 and biasing the piston 54 toward the open position. The valve assembly 80 may be closed by moving or placing the piston 54 in the closed position after a tire inflation or deflation operation has been completed, for example. Again, the orifice 68 facilitates moving the piston 54 from the open position toward the closed position as it delays a decrease of a fluid pressure inside the second control volume 63 with respect to a decrease of a fluid pressure inside the first control volume 62. In this way, the orifice 68 delays a decrease of a closing force exerted on the second actuation surface 65 by a fluid pressure inside the second control volume 63 and biasing the piston 54 toward the closed position with respect to a decrease of an opening force exerted on the first actuation surface 64 by a fluid pressure inside the first control volume 62 and biasing the piston 54 toward the open position.

To deflate the tire 40 via the valve assembly 80, a fluid pressure at the first fluid port 52 and inside the first control volume 62 has to be decreased or lowered below the tire pressure. At the same time, the piston 54 has to stay in the open position during the deflation operation. In order to allow a controlled decrease of a fluid pressure at the first fluid port 52 and inside the first control volume 62 and avoid an undesired movement of the piston 54 toward the closed position during a deflating operation, the valve assembly 80 may include a throttle valve or a further orifice with a variable cross section (not depicted) configured to place or to selectively place the first fluid port 52 and the first control volume 62 in fluid communication with the atmosphere or with a low pressure fluid tank.

Further means for stabilizing the piston 54 in the open position during a deflation operation may include a sealed control chamber 69 and a one-way valve or check valve 70 selectively fluidly connecting the sealed control chamber 69 with the atmosphere. Here, the sealed control chamber 69 is formed or disposed in between the piston 54 and the guide portion 56. The sealed control chamber 69 has an annular shape and surrounds the piston 54. The sealed control chamber 69 is formed and sealed by sealing means 59c and 59d disposed between the piston 54 and the guide portion 56. The sealing means 59c, 59d have an annular shape. The sealing means 59c, 59d provide sliding sealing contact between the piston 54 and the guide portion 56. In the embodiment depicted in the figures the sealing means 59c, 59d are mounted on the piston 54. The sealing means 59c, 59d are configured to move with the piston 54 as the piston 54 moves or is moved relative to the valve body 50. However, it is understood that the sealing means 59c, 59d may be mounted on the guide portion 56.

The annular sealing means 54c have a first radius in a direction perpendicular to the valve axis 55, and the annular sealing means 54d have a second radius in a direction perpendicular to the valve axis 55, wherein the first radius is smaller than the second radius. The piston 54 and the guide portion 56 are configured such that a volume of the sealed control chamber 69 changes as the piston 54 moves or is moved with respect to the valve body 50. More specifically, as the piston 54 is moved toward the open position the volume of the sealed control chamber 69 decreases, and as the piston 54 is moved toward the closed position the volume of the sealed control chamber 69 increases.

The check valve 70 is configured to allow a flow of fluid out of the sealed control chamber 69 through the check valve 70, and to block a flow of fluid into the sealed control chamber 69 through the check valve 70. Consequently, as the piston 54 moves toward the open position, fluid within the sealed control chamber 69 is forced out of the sealed control chamber 69 through the check valve 70. When the piston 54 is in the open position, a fluid pressure inside the sealed control chamber 69 is at atmospheric pressure. On the other hand, as the piston 54 moves toward the closed position, the check valve 70 blocks a flow of fluid into the sealed control chamber 69 through the check valve 70 so that an underpressure is created within the sealed control chamber 69. The underpressure within the sealed control chamber 69 increases as the piston 54 moves or is moved further toward the closed position. In this manner, the underpressure created within the sealed control chamber 69 produces an additional opening force biasing the piston 54 toward the open position. This additional opening force increases as the piston 54 moves or is moved further toward the closed position. In this manner the sealed control chamber 69 and the check valve 70 are configured to stabilize the piston 54 in the open position, for example when deflating the tire 40 via the valve assembly 80. The underpressure created in the sealed control chamber 69 typically depends on a ratio $r=V_{c,max}/V_{c,min}$, wherein $V_{c,max}$ and $V_{c,min}$ are a maximum volume and a minimum volume of the sealed control chamber 69 during a full stroke of the piston, respectively. Here, the ratio $r=V_{c,max}/V_{c,min}$ may fulfill one of the following relations: $r \geq 1.2$, $r \geq 1.4$, or $r \geq 1.6$, for example.

An alternative embodiment of the valve assembly 80 may not include the check valve 70. In this alternative embodiment the sealing means 59d sealing the sealed control chamber 69 from the second control volume 63 may be configured such that it allows a fluid flow from the sealed control chamber 69 and into the second control volume 63 past the sealing means 59d, and that it blocks a fluid flow from the second control volume 63 and into the sealed control chamber 69. In this manner, the sealing means 59d may effectively function as a one-way valve between the sealed control chamber 69 and the second control volume 63.

In the embodiment of the valve assembly 80 depicted in the figures the piston 54, in particular the actuation surfaces 64, 65 of the piston 54, the sealed control chamber 69, and the biasing member 67 are configured such that the piston 54 is kept in the open position when or as long as a pressure $p_1$ applied at the first fluid port 52 exceeds the atmospheric pressure $p_{atm}$ at least by a pressure difference $\Delta p$, that is when or as long as $p_1 \geq p_{atm} + \Delta p$. Typically, $p_{atm}$ is approximately equal to 1.013 bar. This way, the tire 40 may be deflated via the valve assembly 80 as long as the tire pressure $p_{tire}$ fulfills the relation $p_{tire} > p_{atm} + \Delta p$. For example, the valve assembly 80 depicted in the figures may be configured such that $\Delta p$ takes on a value as low as 0.2 bar or 0.4 bar, thereby allowing deflation of the tire 40 even at low tire pressures. However, it is understood that $\Delta p$ may take on other values.

The invention claimed is:

1. A valve assembly for use in a tire inflation system, the valve assembly comprising:

a valve body comprising a first fluid port and a second fluid port; and a piston disposed at least partially within the valve body and configured to be moved relative to the valve body between an open position and a closed position, wherein when the piston is in the open position the first fluid port is fluidly connected with the second fluid port, and wherein when the piston is in the closed position the first fluid port is fluidly isolated from the second fluid port, a sealed control chamber selectively fluidly connected with the atmosphere and the sealed control chamber changing in volume as the piston moves between the open position and the closed position, wherein when the piston is in the open position the first fluid port and the second fluid port are fluidly connected with one another by a fluid channel extending through the piston.

2. The valve assembly of claim 1, further comprising a check valve selectively fluidly connecting the sealed control chamber with the atmosphere.

3. The valve assembly of claim 2, wherein the sealed control chamber, the piston, and the check valve are configured such that as the piston is moved toward the open position the volume of the sealed control chamber decreases and the check valve allows a fluid flow out of the sealed control chamber through the check valve, and as the piston is moved toward the closed position the volume of the sealed control chamber increases and the check valve blocks an inward fluid flow into the sealed control chamber through the check valve, the piston thereby creating an underpressure condition in the sealed control chamber as the piston is moved toward the closed position.

4. The valve assembly of 3, further comprising a guide portion disposed or formed within the valve body for guiding the piston, wherein the piston comprises a body portion which is at least partially received within the guide portion and wherein the sealed control chamber is formed in between the body portion of the piston and the guide portion.

5. The valve assembly of claim 1, further comprising a first control volume formed within the valve body and fluidly connected or fluidly connectable with the first fluid port, wherein the piston and the first control volume are configured such that a fluid pressure in the first control volume biases the piston towards the open position.

6. The valve assembly of claim 5, further comprising a second control volume formed within the valve body and fluidly connected or fluidly connectable with the first fluid port, wherein the piston and the second control volume are configured such that a second fluid pressure in the second control volume biases the piston towards the closed position.

7. The valve assembly of claim 6, wherein the second control volume is fluidly connected or fluidly connectable with the first fluid port through an orifice formed in the piston.

8. The valve assembly of claim 7, wherein the piston, the second control volume and the orifice are configured such that $V/A \geq 5 \cdot 10^3$ mm, wherein V is a volume of the second control volume measured in $mm^3$ when the piston is in the open position, and wherein A is a minimum cross section of the orifice measured in $mm^2$.

9. The valve assembly of claim 6, further comprising a biasing member disposed in the second control volume and biasing the piston toward the closed position.

10. The valve assembly of claim 5, wherein the piston is linearly movable with respect to the valve body along a valve axis and comprises a body portion and an actuation portion extending from the body portion perpendicular to the axis, the actuation portion comprising a first actuation surface delimiting the first control volume and a second actuation surface delimiting the second control volume, wherein the fluid pressure in the first control volume exerts an opening force on the first actuation surface biasing the piston toward the open position and wherein a second fluid pressure in the second control volume exerts a closing force on the second actuation surface biasing the piston toward the closed position.

11. The valve assembly of claim 10, wherein an area of the first actuation surface is larger than an area of the second actuation surface such that when the fluid pressure in the first control volume is equal to the second fluid pressure in the second control volume, a net force on the piston resulting from an opening force exerted on the first actuation surface by the fluid pressure in the first control volume and from a closing force exerted on the second actuation surface by the second fluid pressure in the second control volume biases the piston toward the open position.

12. The valve assembly of claim 5, wherein a sealed control chamber, the biasing member, the first actuation surface of the piston and the second actuation surface of the piston are configured such that when the piston is in the open position a pressure $p_1$ applied at the first fluid port with $p_1 \geq p_{atm}+0.4$ bar is configured to maintain the piston in the open position, thereby allowing a pneumatic tire fluidly connected with the second fluid port and having a tire pressure of $p_{tire} > p_{atm}+0.4$ bar to be deflated by the first fluid port, where $p_{tire}$ is the pressure inside the pneumatic tire and $p_{atm}$ is atmospheric pressure, wherein the sealed control chamber and the piston are configured such that a volume of the sealed control chamber changes as the piston is moved between the open position and the closed position.

13. The valve assembly of claim 1, wherein the piston is linearly movable with respect to the valve body along a valve axis and comprises a body portion and a seal portion extending from the body portion perpendicular to the valve axis, the valve assembly further comprising a seat portion forming a valve seat for the seal portion of the piston, wherein the seat portion and the piston are configured such that when the piston is in the closed position the seal portion of the piston is sealingly received in the seat portion and fluidly isolates the first fluid port from the second fluid port and a fluid pressure at the second fluid port exerts a closing force on the piston which forces the seal portion of the piston against the seat portion.

14. The valve assembly of claim 13, wherein the piston is linearly movable with respect to the valve body along the valve axis and wherein the fluid channel extends through the piston at least partially along the valve axis, the piston further comprising one or more side openings in fluid communication with the axially extending fluid channel, the side openings ending in an axially extending outer surface of the piston and being disposed at a distance from the seal portion of the piston along the valve axis, wherein when the piston is in the open position the first fluid port and the second fluid port are fluidly connected with one another by the fluid channel and the side openings.

15. A tire inflation system, comprising:

a valve assembly comprising a valve body comprising a first fluid port and a second fluid port;

a piston disposed at least partially within the valve body and configured to be moved relative to the valve body between an open position and a closed position, wherein when the piston is in the open position the first fluid port is fluidly connected with the second fluid port, and wherein when the piston is in the closed position the first fluid port is fluidly isolated from the second fluid port, a sealed control chamber selectively fluidly connected with the atmosphere and the sealed control chamber changing in volume as the piston moves between the open position and the closed position, wherein when the piston is in the open position the first fluid port and the second fluid port are fluidly connected with one another by a fluid channel extending through the piston;

a pneumatic tire fluidly connected with the second fluid port of the valve assembly; and a pressure source, wherein for pressurizing and for de-pressurizing the pneumatic tire the first fluid port of the valve assembly is selectively fluidly connected with the pressure source and with the atmosphere.

16. A valve assembly for use in a tire inflation system, the valve assembly comprising:

a valve body comprising a first fluid port and a second fluid port;

a piston disposed at least partially within the valve body and configured to be moved relative to the valve body between an open position and a closed position, wherein when the piston is in the open position the first fluid port is fluidly connected with the second fluid port, and wherein when the piston is in the closed position the first fluid port is fluidly isolated from the second fluid port, wherein when the piston is in the open position the first fluid port and the second fluid port are fluidly connected with one another by a fluid channel extending through the piston; and a sealed control chamber and a check valve selectively fluidly connecting the sealed control chamber with the atmosphere, wherein the sealed control chamber and the piston are configured such that a volume of the sealed control chamber changes as the piston is moved between the open position and the closed position, wherein the sealed control chamber, the piston, and the check valve are configured such that as the piston is moved toward the open position the volume of the sealed control chamber decreases and the check valve allows a fluid flow out of the sealed control chamber through the check valve, and as the piston is moved toward the closed position the volume of the sealed control chamber increases and the check valve blocks an inward fluid flow into the sealed control chamber through the check valve, the piston thereby creating an under-pressure condition in the sealed control chamber as the piston is moved toward the closed position.

17. The valve assembly of claim 16, wherein a guide portion is disposed or formed within the valve body for guiding the piston, wherein the piston comprises a body portion which is at least partially received within the guide portion and wherein the sealed control chamber is formed in between the body portion of the piston and the guide portion.

18. The valve assembly of claim 16, further comprising a first control volume formed within the valve body and fluidly connected or fluidly connectable with the first fluid port, wherein the piston and the first control volume are configured such that a fluid pressure in the first control volume biases the piston towards the open position, further comprising a second control volume formed within the valve body and fluidly connected or fluidly connectable with the first fluid port, wherein the piston and the second control volume are configured such that a second fluid pressure in the second control volume biases the piston towards the closed position, wherein the second control volume is fluidly connected or fluidly connectable with the first fluid port through an orifice formed in the piston.

19. The valve assembly of claim 18, wherein the piston is linearly movable with respect to the valve body along a valve axis and comprises a body portion and an actuation portion extending from the body portion perpendicular to the axis, the actuation portion comprising a first actuation surface delimiting the first control volume and a second actuation surface delimiting the second control volume, wherein the fluid pressure in the first control volume exerts an opening force on the first actuation surface biasing the piston toward the open position and wherein the second fluid pressure in the second control volume exerts a closing force on the second actuation surface biasing the piston toward the closed position.

20. The valve assembly of claim 19, wherein an area of the first actuation surface is larger than an area of the second actuation surface such that when the fluid pressure in the first control volume is equal to the second fluid pressure in the second control volume, a net force on the piston resulting from an opening force exerted on the first actuation surface by the fluid pressure in the first control volume and from a closing force exerted on the second actuation surface by the second fluid pressure in the second control volume biases the piston toward the open position, and wherein the sealed control chamber, the biasing member, the first actuation surface of the piston and the second actuation surface of the piston are configured such that when the piston is in the open position a pressure $p_1$ applied at the first fluid port with $p_1 \geq p_{atm}+0.4$ bar is configured to maintain the piston in the open position, thereby allowing a pneumatic tire fluidly connected with the second fluid port and having a tire pressure of $p_{tire} > p_{atm}+0.4$ bar to be deflated by the first fluid port, where $p_{tire}$ is the pressure inside the pneumatic tire and $p_{atm}$ is atmospheric pressure, wherein the sealed control chamber and the piston are configured such that a volume of the sealed control chamber changes as the piston is moved between the open position and the closed position.

* * * * *